United States Patent
Forster et al.

(10) Patent No.: US 11,078,655 B2
(45) Date of Patent: Aug. 3, 2021

(54) VACUUM WASTE SYSTEM

(71) Applicant: B/E Aerospace, Inc., Winston Salem, NC (US)

(72) Inventors: Charles F. Forster, Arlington, WA (US); Frank E. Hashberger, Snohomish, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 51 days.

(21) Appl. No.: 16/278,894

(22) Filed: Feb. 19, 2019

(65) Prior Publication Data

US 2021/0115653 A1 Apr. 22, 2021

(51) Int. Cl.
*E03D 5/016* (2006.01)
*B64D 11/02* (2006.01)

(52) U.S. Cl.
CPC .............. *E03D 5/016* (2013.01); *B64D 11/02* (2013.01)

(58) Field of Classification Search
CPC .................................................... E03D 5/016
USPC .............................. 4/316, 431, 434, 405, 378
See application file for complete search history.

(56) References Cited

U.S. PATENT DOCUMENTS

| | | | | |
|---|---|---|---|---|
| 4,184,506 A | * | 1/1980 | Varis | E03F 1/006 137/205 |
| 4,713,847 A | * | 12/1987 | Oldfelt | B64D 11/02 137/192 |
| 4,819,279 A | * | 4/1989 | Sigler | E03F 1/006 4/300 |
| 5,396,668 A | * | 3/1995 | Haatanen | E03F 1/006 4/321 |
| 6,216,285 B1 | * | 4/2001 | Olin | E03F 1/006 4/321 |
| 6,347,416 B1 | * | 2/2002 | Anderson | E03D 11/02 4/431 |
| 6,349,424 B1 | * | 2/2002 | Stradinger | E03D 3/02 4/378 |
| 6,349,425 B1 | * | 2/2002 | Stradinger | E03D 3/02 137/588 |

(Continued)

FOREIGN PATENT DOCUMENTS

| | | |
|---|---|---|
| DE | 102004029040 A1 | 12/2005 |
| EP | 0763633 A1 | 3/1997 |

OTHER PUBLICATIONS

Extended EP Search Report dated Jun. 9, 2020 for EP Application No. 20158328.

*Primary Examiner* — Lori L Baker
(74) *Attorney, Agent, or Firm* — Suiter Swantz pc llo

(57) ABSTRACT

A waste system includes a vacuum cell, a flexible waste container, and a vacuum source. The flexible waste container may have at least one flexible membrane at an interface between the flexible waste container and the vacuum cell. The vacuum source may be configured to suction air out of the vacuum cell to generate a negative pressure in the vacuum cell. The vacuum source discharge is generally odorless as it is separated from the waste. This odorless discharge can enter occupied aircraft compartments. The negative pressure in the vacuum cell acts on the flexible waste container to generate a (second) negative pressure in the flexible waste container. The negative pressure in the flexible waste container acts on an interface between a toilet and the flexible waste container to pull waste from the toilet into the flexible waste container.

9 Claims, 3 Drawing Sheets

(56) References Cited

U.S. PATENT DOCUMENTS

| | | | |
|---|---|---|---|
| 6,353,942 B1 * | 3/2002 | Pondelick | E03D 11/02 4/431 |
| 6,370,709 B1 * | 4/2002 | Stradinger | E03F 1/006 137/588 |
| 6,453,481 B1 * | 9/2002 | Pondelick | B64D 11/02 4/431 |
| 8,185,977 B2 * | 5/2012 | Seibt | E03F 1/006 4/431 |
| 8,607,370 B2 * | 12/2013 | Hoang | E03F 1/006 4/430 |
| 9,015,872 B2 * | 4/2015 | Seibt | B64D 11/02 4/431 |
| 9,701,410 B2 * | 7/2017 | Boodaghians | E03F 1/006 |
| 9,783,308 B2 * | 10/2017 | Holmes | B64D 13/06 |
| 9,845,592 B2 * | 12/2017 | Wiwi | E03D 11/10 |
| 10,118,702 B2 * | 11/2018 | Holmes | B64D 11/02 |

\* cited by examiner

VACUUM WASTE SYSTEM

BACKGROUND

Some aircraft vacuum waste systems are large centralized systems designed to operate on the differential pressure between the interior of the aircraft and the exterior during flight and use a vacuum blower to create vacuum when the aircraft is on the ground. On aircraft that have not been designed with a centralized vacuum waste system as part of the basic aircraft structure, it may be expensive and/or difficult to install a centralized system (e.g., as a retrofit or modification to existing structures on the aircraft) as these systems require penetrations through the hull of the aircraft for emptying waste tanks and discharge waste odors produced from the creating system vacuum.

SUMMARY

A waste system is disclosed. In one or more embodiments, the waste system includes a vacuum cell, a flexible waste container, and a vacuum source. The flexible waste container may have at least one flexible membrane at an interface between the flexible waste container and the vacuum cell. The vacuum source may be configured to suction air out of the vacuum cell to generate a negative pressure in the vacuum cell. The negative pressure in the vacuum cell acts on the flexible waste container to generate a (second) negative pressure in the flexible waste container. The negative pressure in the flexible waste container acts on an interface between a toilet and the flexible waste container to pull waste from the toilet into the flexible waste container.

In some embodiments of the waste system, the waste system further includes a vacuum valve between the vacuum cell and the vacuum source. The vacuum valve may be configured to open when the vacuum source is suctioning air out of the vacuum cell and configured to close after the vacuum source has suctioned air out of the vacuum cell.

In some embodiments of the waste system, the vacuum source may be a pump.

In some embodiments of the waste system, the pump may be a pulsating pump.

In some embodiments of the waste system, the waste system further includes a discharge valve between the pump and a discharge vent. The discharge valve may be configured to open so that at least a portion of the air suctioned out of the vacuum cell is discharged through the discharge vent.

In some embodiments of the waste system, the pump may be configured to pump air back into the vacuum cell to remove the negative pressure from the vacuum cell.

In some embodiments of the waste system, the waste system further includes a vent valve between the vacuum cell and an air intake vent. The vent valve may be configured to open so that air enters the vacuum cell through the air intake vent and removes the negative pressure from the vacuum cell.

In some embodiments of the waste system, the waste system further includes a discharge valve between the flexible waste container and a discharge vent. The discharge valve may be configured to open so that excess air is discharged from the flexible waste container through the discharge vent.

In some embodiments of the waste system, the vacuum cell, the flexible waste container, and the vacuum source are integrated into a modular unit.

In some embodiments of the waste system, the modular unit includes a common support structure for the vacuum cell, the flexible waste container, and the vacuum source.

In some embodiments of the waste system, the waste system further includes a switch and a controller. The controller may be communicatively coupled to the switch, the vacuum source, and one or more valves of the waste system. The controller may be configured to operate the vacuum source and the one or more valves in response to a signal from the switch.

In one or more embodiments, the waste system includes a waste container, a vacuum cell, a flexible cell, and a vacuum source. The flexible cell may have at least one flexible membrane at an interface between the flexible cell and the vacuum cell. The vacuum source may be configured to suction air out of the vacuum cell to generate a negative pressure in the vacuum cell. The negative pressure in the vacuum cell acts on the flexible cell to generate a (second) negative pressure in the flexible cell. The negative pressure in the flexible cell acts on the waste container to generate a (third) negative pressure in the waste container. The negative pressure in the waste container acts on an interface between a toilet and the waste container to pull waste from the toilet into the waste container.

In some embodiments of the waste system, the waste system further includes a vacuum valve between the vacuum cell and the vacuum source. The vacuum valve may be configured to open when the vacuum source is suctioning air out of the vacuum cell and configured to close after the vacuum source has suctioned air out of the vacuum cell.

In some embodiments of the waste system, the vacuum source may be a pump.

In some embodiments of the waste system, the pump may be a pulsating pump.

In some embodiments of the waste system, the waste system further includes a discharge valve between the pump and a discharge vent. The discharge valve may be configured to open so that at least a portion of the air suctioned out of the vacuum cell is discharged through the discharge vent.

In some embodiments of the waste system, the pump may be configured to pump air back into the vacuum cell to remove the negative pressure from the vacuum cell.

In some embodiments of the waste system, the waste system further includes a vent valve between the vacuum cell and an air intake vent. The vent valve may be configured to open so that air enters the vacuum cell through the air intake vent and removes the negative pressure from the vacuum cell.

In some embodiments of the waste system, the waste system further includes a discharge valve between the waste container and a discharge vent. The discharge valve may be configured to open so that excess air is discharged from the waste container through the discharge vent.

In some embodiments of the waste system, the waste container, the vacuum cell, the flexible cell, and the vacuum source are integrated into a modular unit.

In some embodiments of the waste system, the modular unit includes a common support structure for the waste system, the waste container, the vacuum cell, the flexible cell, and the vacuum source.

In some embodiments of the waste system, the waste system further includes a switch and a controller. The controller may be communicatively coupled to the switch, the vacuum source, and one or more valves of the waste system. The controller may be configured to operate the vacuum source and the one or more valves in response to a signal from the switch.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
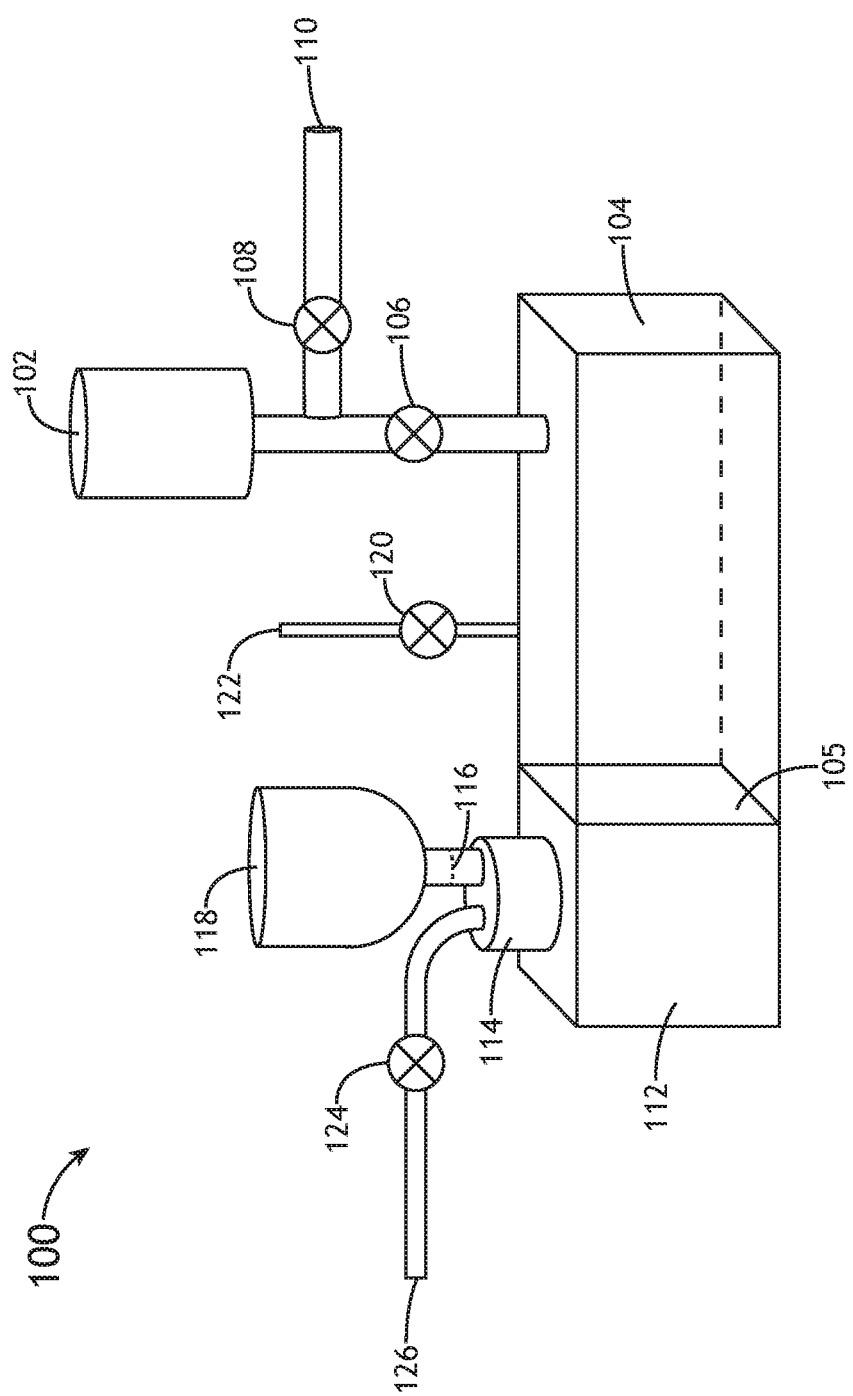
FIG. 1 is a block diagram illustrating a waste system, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A vacuum waste system is disclosed. A vacuum waste system is disclosed that allows vacuum creation without the discharge of waste odors. As noted above, on aircraft that have not been designed with a centralized vacuum waste system as part of the basic aircraft structure, it may be expensive and/or difficult to install a centralized system (e.g., as a retrofit or modification to existing structures on the aircraft). One solution for installing lavatories in aircraft without an existing centralized vacuum system is to install a chemical system (e.g., a "blue water" toilet system). However, chemical systems may be unfavorable due to odors generated by the re-circulating fluid and/or maintenance costs associated therewith. There is a need for a vacuum waste system solution that can be retrofitted or installed as a simplified modular unit in combination with an aircraft lavatory, but without extensive modification to an aircraft structure.

The waste system disclosed herein may be installed on an airplane without the need for vacuum blower discharge to be vented overboard. Some vacuum waste systems may utilize a vacuum blower to create vacuum. The vacuum blowers may move a large volume of air to create vacuum needed to move waste from the toilet to the waste tank. The air moved by these vacuum blowers may contain biohazards and odors that cannot be discharged into the airplane interior. These vacuum blowers discharge air requires discharge outside the aircraft via a hull penetration. The disclosed waste system employs a flexible cell that allows vacuum to be created without the discharge of odorous/biohazardous air.

Additionally, the disclosed waste system may employ a vacuum pump configuration that allows the waste system to be operated at intermediate altitudes. Some vacuum waste systems may only be used when the airplanes are on the ground or upon reaching cruising altitude.

FIG. 1 is a block diagram illustrating a waste system 100, in accordance with one or more embodiments of this disclosure. In embodiments, the waste system 100 includes a vacuum cell 104, a flexible waste container 112, and a vacuum source 102. The waste system 100 allows a vacuum toilet system to function within an aircraft interior without direct discharge to atmosphere. Air extracted to create vacuum is separated from waste due to the waste being contained in the flexible waste container 112. Details of operation and configuration of components are provided below.

The flexible waste container 112 may have at least one flexible membrane at an interface 105 between the flexible waste container 112 and the vacuum cell 104. In some embodiments, the flexible waste container 112 is fully formed from the flexible membrane. For example, the flexible waste container 112 may be a flexible bladder or a flexible cell defined by the flexible (e.g., deformable) membrane. In other embodiments, the flexible waste container 112 is partially formed from the flexible membrane. For example, the flexible waste container 112 may include at least one portion (e.g., wall, divider, partition) at the interface 105 between the flexible waste container 112 and the vacuum cell 104 that is defined by the flexible membrane and at least one other portion defined by a rigid structure. In some embodiments, the flexible waste container 112 and the vacuum cell 104 are defined by portions of a common tank or chamber with a flexible membrane (at interface 105) that partitions the two portions of the tank/chamber from one another.

The vacuum source 102 may be or may include a pump (e.g., a pulsating (or "pulse type") pump, pneumatic pump, peristaltic pump, or the like), a blower, or any other source of negative pressure (e.g., a depressurized chamber/canister, a connection to atmosphere outside the aircraft, etc.). In some embodiments, the waste system 100 may include two or more vacuum sources 102. For example, the waste system 100 may employ atmospheric pressure differential during flight and another source when the aircraft is on the ground. In some embodiments, the vacuum source 102 may be or may include a vacuum generator that is structured and/or configured in accordance with one or more embodiments described in U.S. Pat. No. 8,607,370, titled "FLUSH VALVE AND VACUUM GENERATOR FOR VACUUM WASTE SYSTEM," which is incorporated herein by reference in its entirety.

The waste system 100 may include a vacuum valve 106 between the vacuum cell 104 and the vacuum source 102. The vacuum valve 106 may be configured to open when the vacuum source 102 is suctioning air out of the vacuum cell 104 and configured to close after the vacuum source 102 has suctioned air out of the vacuum cell 104 (e.g., to generate and maintain a negative pressure in the vacuum cell 104).

In embodiments where the vacuum source 102 is a pump, the waste system 100 may further include discharge valve 108 between the pump and a discharge vent 110. The discharge valve 108 may be configured to open so that at least a portion of the air suctioned out of the vacuum cell 104 can be discharged through the discharge vent 110 (e.g., to depressurize the pump between pump pulses and/or after closing the vacuum valve 106).

In operation (e.g., during a toilet flush sequence), the vacuum source 102 may be configured to suction air out of the vacuum cell 104 to generate a negative pressure in the vacuum cell 104. The negative pressure in the vacuum cell 104 acts on the flexible waste container 112 to generate a (second) negative pressure in the flexible waste container 112. The negative pressure in the flexible waste container 112 acts on an interface 114 between a toilet 118 and the flexible waste container 112 to pull waste from the toilet 118 into the flexible waste container 112.

A flush valve 116 may be located at or near the interface 114 between the flexible waste container 112 and the toilet 118. In some embodiments, the negative pressure in the flexible waste container 112 may force open the flush valve 116. Alternatively, the flush valve 116 may be mechanically or electromechanically actuated by a toilet flush lever, button, switch (e.g., switch 308), or the like. In some embodiments, the flush valve 116 may be structured and/or configured in accordance with one or more embodiments described in U.S. Pat. No. 8,607,370, which has been incorporated herein by reference in its entirety.

The waste system 100 includes one or more mechanisms for restoring the air removed from the vacuum cell 104. In some embodiments, the waste system 100 includes a vent valve 120 between the vacuum cell 104 and an air intake vent 122. After the toilet flush sequence is completed, the vent valve 120 may be configured to open so that air enters the vacuum cell 104 through the air intake vent 122 and removes the negative pressure from the vacuum cell 104. In other embodiments, the vacuum source 102 (e.g., a pump or blower) may be configured to pump/blow air back into the vacuum cell 104 to remove the negative pressure from the vacuum cell 104.

The waste system 100 also includes one or more mechanisms for removing excess air pulled into the flexible waste container 112 with waste from the toilet 118 when the toilet flush sequence is performed. In some embodiments, the waste system 100 includes a discharge valve 124 between the flexible waste container 112 and a discharge vent 126. After the toilet flush sequence is completed, the discharge valve 124 may be configured to open so that excess air is discharged from the flexible waste container 112 through the discharge vent 126. The air discharged from the flexible waste container 112 may have an unpleasant odor. To prevent passenger discomfort, the discharge vent 126 may be located in an unoccupied portion (e.g., cargo hold, empty portion of the fuselage, etc.) of the aircraft and/or in proximity to a pressure regulating vent (e.g., outflow valve that regulates the amount of air discharged from the cabin interior to atmosphere outside the aircraft in order to maintain a selected pressure within the main cabin). In some embodiments, the discharge vent 126 itself may be configured to discharge the excess air from the flexible waste container 112 from the aircraft to atmosphere outside the aircraft via a new or existing hull penetration.

In some embodiments, waste system 100 is a modular and/or self-contained unit. In this regard, the vacuum cell 104, flexible waste container 112, and vacuum source 102 may be integrated into a modular unit that can be installed within an aircraft lavatory. In some embodiments, the modular unit may include or may be carried on a common support structure (e.g., a pallet) for the vacuum cell 104, flexible waste container 112, and vacuum source 102.

Figure 3:
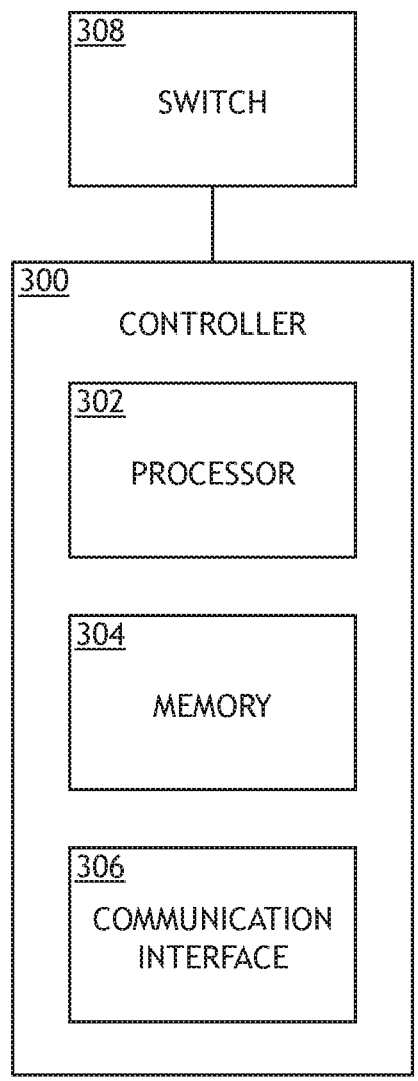
FIG. 3 is a block diagram illustrating a controller for a waste system, such as the waste system illustrated in FIG. 1 or FIG. 2, in accordance with one or more embodiments of this disclosure.

The vacuum source 102, valves (e.g., valves 106, 108, 116, 120, and/or 124), and/or any other electronic/electromechanical components (e.g., actuators, sensors, etc.) of the waste system 100 may be electronically controlled. For example, FIG. 3 illustrates a controller 300 that can be configured to signal the components to perform the toilet flush sequence, followed by steps/operations to restore initial pressures within the vacuum cell 104 and the flexible waste container 112, when a switch 308 coupled to the controller 300 is toggled, flipped, electronically switched, or otherwise triggered.

The switch 308 may be any type of electronic or electromechanical switch. In some embodiments, the switch 308 is an electromechanical switch that is triggered when a toilet handle or lever is pushed, pulled, or turned, or when a flush button is pushed. In other embodiments, the switch 308 may include or may be coupled to a proximity detector (e.g., optical sensor) that triggers the switch 308 based on sensing presence of a new user, departure of a current/previous user, or the like. The switch 308 can also be triggered based signals from a capacitive touch sensor or a gesture control sensor. In general, the switch 308 can be triggered by any type of human machine interface for activating the toilet flush sequence without departing from the scope of this disclosure.

The controller 300 may be communicatively coupled to the switch 308, the vacuum source 102, and one or more valves (e.g., valves 106, 108, 116, 120, and/or 124) of the waste system 100. The controller 300 may be configured to operate the vacuum source 102 and the one or more valves in response to a signal from the switch 308. In embodiments, the controller 300 may include a processor 302, memory 304, and a communication interface 306.

The processor 302 provides processing functionality for at least the controller 300 and can include any number of processors, micro-controllers, circuitry, field programmable gate array (FPGA) or other processing systems, and resident or external memory for storing data, executable code, and other information accessed or generated by the controller 300. The processor 302 can execute one or more software programs embodied in a non-transitory computer readable medium (e.g., memory 304) that implement techniques described herein. The processor 302 is not limited by the materials from which it is formed, or the processing mechanisms employed therein and, as such, can be implemented via semiconductor(s) and/or transistors (e.g., using electronic integrated circuit (IC) components), and so forth.

The memory 304 can be an example of tangible, computer-readable storage medium that provides storage functionality to store various data and/or program code associated with operation of the controller 300/processor 302, such as software programs and/or code segments, or other data to instruct the processor 302, and possibly other components of the controller 300, to perform the functionality described herein. Thus, the memory 304 can store data, such as a program of instructions for operating the controller 300, including its components (e.g., processor 302, communication interface 306, etc.), and so forth. It should be noted that while a single memory 304 is described, a wide variety of types and combinations of memory (e.g., tangible, non-transitory memory) can be employed. The memory 304 can be integral with the processor 302, can comprise stand-alone memory, or can be a combination of both. Some examples of the memory 304 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 306 can be operatively configured to communicate with components of the controller 300. For example, the communication interface 306 can be configured to retrieve data from the processor 302 or other devices, transmit data for storage in the memory 304, retrieve data from storage in the memory 304, and so forth. The communication interface 306 can also be communicatively coupled with the processor 302 to facilitate data transfer between components of the controller 300 and the processor 302. It should be noted that while the communication interface 306 is described as a component of the controller 300, one or more components of the communication interface 306 can be implemented as external components communicatively coupled to the controller 300 via a wired and/or wireless connection. The controller 300 may be connected to one or more input/output (I/O) devices (e.g., switch 308), system components (e.g., vacuum source 102, valves 106, 108, 116, 120, and/or 124, etc.), and so forth via the communication interface 306. In embodiments, the communication interface 306 may include a transmitter, receiver, transceiver, physical connection interface, or any combination thereof.

In embodiments, the controller 300 may be configured to operate the waste system 100 as follows.

The controller 300 may be configured to receive a flush command (e.g., signal) that initiates the toilet flush sequence via the switch 308.

In response, the controller 300 may be configured to open the vacuum valve 106 and cause the vacuum source 102 to suction air out of the vacuum cell 104 through the vacuum valve 106 to generate a negative pressure in the vacuum cell 104.

In some embodiments, to depressurize the vacuum source 102 (e.g., between pump pulses) the controller 300 is configured to open the discharge valve 108 so that at least a portion of the air removed from the vacuum cell 104 can be discharged through discharge vent 110.

The negative pressure in the vacuum cell 104 acts on the flexible waste container 112 to generate a (second) negative pressure in the flexible waste container 112.

The negative pressure in the flexible waste container 112 acts on an interface 114 between a toilet 118 and the flexible waste container 112 to pull waste from the toilet 118 into the flexible waste container 112. At this point, the negative pressure in the flexible waste container 112 or the controller 300 may open flush valve 116 so that the waste from the toilet 118 can be pulled into the flexible waste container 112. Excess air may also be ingested into the flexible waste container 112.

The flush valve 116 may close, marking an end of the toilet flush sequence.

The controller 300 may be configured to open the vent valve 120 so that air enters the vacuum cell 104 through the air intake vent 122 and removes the negative pressure from the vacuum cell 104. In other embodiments, the controller 300 may be configured to cause the vacuum source 102 (e.g., a pump or blower) to pump/blow air back into the vacuum cell 104 to remove the negative pressure from the vacuum cell 104.

The restorative air entering the vacuum cell 104 may push excess air out of the flexible waste container 112. For this to happen, the controller 300 may be configured to open a discharge valve 124 between the flexible waste container 112 and a discharge vent 126 so that excess air is discharged from the flexible waste container 112 through the discharge vent 126.

The controller 300 may be configured to close the discharge valve 124 and vent valve 120/vacuum valve 106 after restoring air in the vacuum cell 104 and discharging excess air from the flexible waste container 112. The waste system 100 will then be restored to its initial (pre-flush) settings so that the toilet flush sequence can be repeated when the switch 308 is triggered again (e.g., by the next user).

Figure 2:
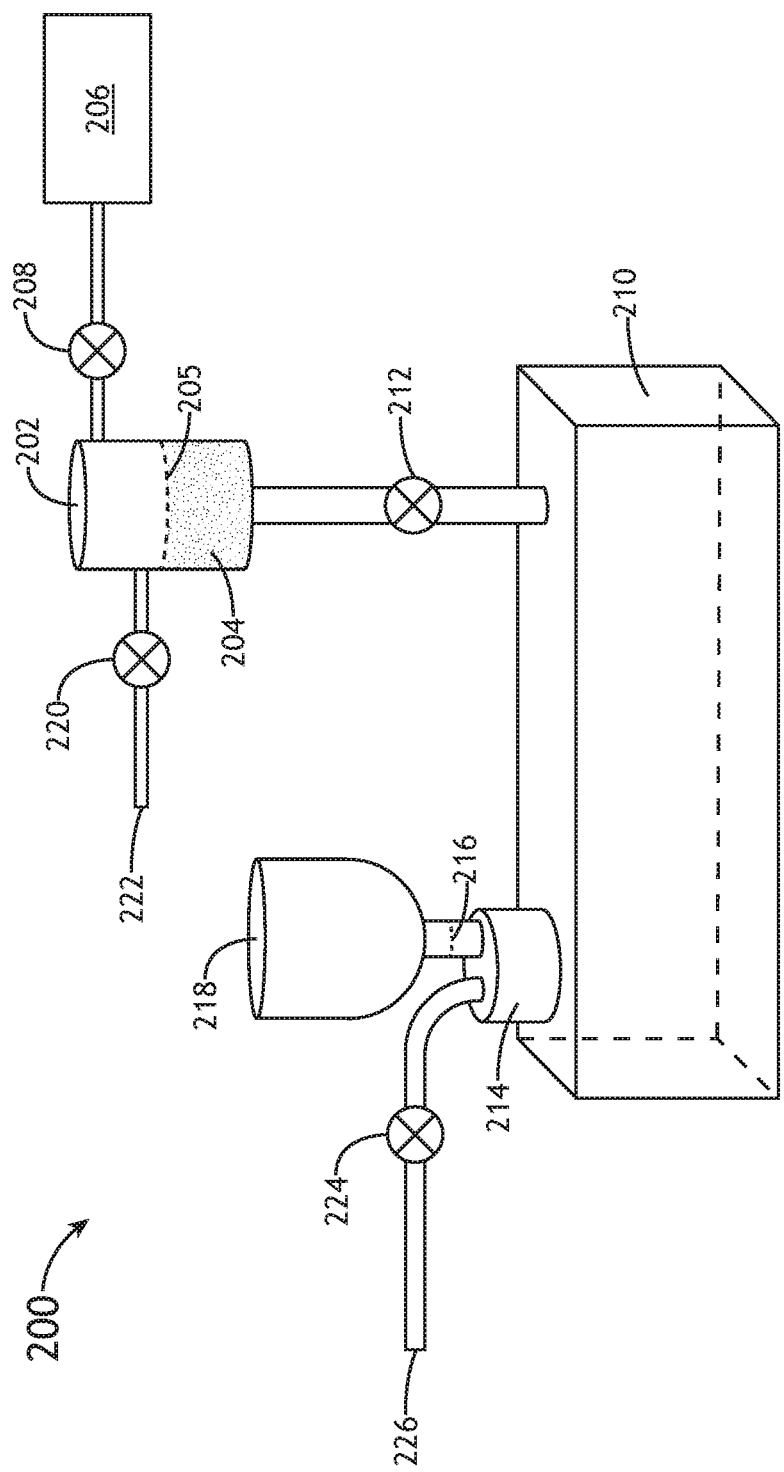
FIG. 2 is a block diagram illustrating a waste system, in accordance with one or more embodiments of this disclosure.

FIG. 2 is a block diagram illustrating a waste system 200, in accordance with one or more alternative embodiments of this disclosure. In embodiments, the waste system 200 includes a waste container 210, a vacuum cell 202, a flexible cell 204, and a vacuum source 206. Details of operation and configuration of components are provided below.

The flexible cell 204 may have at least one flexible membrane at an interface 205 between the flexible cell 204 and the vacuum cell 202. In some embodiments, the flexible cell 204 is fully formed from the flexible membrane. For example, the flexible cell 204 may be a flexible bladder or a flexible cell defined by the flexible (e.g., deformable) membrane. In other embodiments, the flexible cell 204 is partially formed from the flexible membrane. For example, the flexible cell 204 may include at least one portion (e.g., wall, divider, partition) at the interface 205 between the flexible cell 204 and the vacuum cell 202 that is defined by the flexible membrane and at least one other portion defined by a rigid structure. In some embodiments, the flexible cell 204 and the vacuum cell 202 are defined by portions of a common tank or chamber with a flexible membrane (at interface 205) that partitions the two portions of the tank/chamber from one another.

The vacuum source 206 may be or may include a pump (e.g., a pulsating (or "pulse type") pump, pneumatic pump, peristaltic pump, or the like), a blower, or any other source of negative pressure (e.g., a depressurized chamber/canister, a connection to atmosphere outside the aircraft, etc.), or any combination thereof. In some embodiments, the waste system 200 may include two or more vacuum sources 206. For example, the waste system 200 may employ atmospheric pressure differential during flight and another source when the aircraft is on the ground. In some embodiments, the vacuum source 206 may be or may include a vacuum generator that is structured and/or configured in accordance with one or more embodiments described in U.S. Pat. No. 8,607,370, which has been incorporated herein by reference in its entirety.

The waste system 200 may include a vacuum valve 208 between the vacuum cell 202 and the vacuum source 206. The vacuum valve 208 may be configured to open when the vacuum source 206 is suctioning air out of the vacuum cell 202 and configured to close after the vacuum source 206 has suctioned air out of the vacuum cell 202 (e.g., to generate and maintain a negative pressure in the vacuum cell 202).

In embodiments where the vacuum source 206 is a pump, the waste system 200 may further include discharge valve between the pump and a discharge vent (not shown in FIG. 2). The discharge valve may be configured to open so that at least a portion of the air suctioned out of the vacuum cell 202 can be discharged through the discharge vent (e.g., to depressurize the pump between pump pulses and/or after closing the vacuum valve 208).

In operation (e.g., during a toilet flush sequence), the vacuum source 206 may be configured to suction air out of the vacuum cell 202 to generate a negative pressure in the vacuum cell 202. The negative pressure in the vacuum cell 202 acts on the flexible cell 204 to generate a (second) negative pressure in the flexible cell 204. The negative pressure in the flexible cell 204 acts on the waste container 210 to generate a (third) negative pressure in the waste container 210. The negative pressure in the waste container 210 acts on an interface 214 between a toilet 218 and the waste container 210 to pull waste from the toilet 218 into the waste container 210.

A flush valve 216 may be located at or near the interface 214 between the waste container 210 and the toilet 218. In some embodiments, the negative pressure in the waste container 210 may force open the flush valve 216. Alternatively, the flush valve 216 may be mechanically or electromechanically actuated by a toilet flush lever, button, switch (e.g., switch 308), or the like. In some embodiments, the flush valve 216 may be structured and/or configured in accordance with one or more embodiments described in U.S. Pat. No. 8,607,370, which has been incorporated herein by reference in its entirety.

The waste system 200 includes one or more mechanisms for restoring the air removed from the vacuum cell 202. In some embodiments, the waste system 200 includes a vent valve 220 between the vacuum cell 202 and an air intake vent 222. After the toilet flush sequence is completed, the vent valve 220 may be configured to open so that air enters the vacuum cell 202 through the air intake vent 222 and removes the negative pressure from the vacuum cell 202. In other embodiments, the vacuum source 206 (e.g., a pump or blower) may be configured to pump/blow air back into the vacuum cell 202 to remove the negative pressure from the vacuum cell 202.

The waste system 200 also includes one or more mechanisms for removing excess air pulled into the flexible cell 204 and/or waste container 210 when the toilet flush sequence is performed. In some embodiments, the waste system 200 includes a discharge valve 224 between the flexible cell 204 and/or waste container 210 and a discharge vent 226. After the toilet flush sequence is completed, the discharge valve 224 may be configured to open so that excess air is discharged from the flexible cell 204 and/or waste container 210 through the discharge vent 226. The air discharged from the flexible cell 204 and/or waste container 210 may have an unpleasant odor. To prevent passenger discomfort, the discharge vent 226 may be located in an unoccupied portion (e.g., cargo hold, empty portion of the fuselage, etc.) of the aircraft and/or in proximity to a pressure regulating vent (e.g., outflow valve that regulates the amount of air discharged from the cabin interior to atmosphere outside the aircraft in order to maintain a selected pressure within the main cabin). In some embodiments, the discharge vent 226 itself may be configured to discharge the excess air from the flexible cell 204 from the aircraft to atmosphere outside the aircraft via a new or existing hull penetration.

In some embodiments, waste system 200 is a modular and/or self-contained unit. In this regard, the waste container 210, vacuum cell 202, flexible cell 204, and vacuum source 206 may be integrated into a modular unit that can be installed within an aircraft lavatory. In some embodiments, the modular unit may include or may be carried on a common support structure (e.g., a pallet) for the waste container 210, vacuum cell 202, flexible cell 204, and vacuum source 206.

The vacuum source 206, valves (e.g., valves 208, 212, 216, 220, and/or 224), and/or any other electronic/electromechanical components (e.g., actuators, sensors, etc.) of the waste system 200 may be electronically controlled. For example, the controller 300 illustrated in FIG. 3 may be configured to signal the components to perform the toilet flush sequence, followed by steps/operations to restore initial pressures within the vacuum cell 202 and the flexible cell 204, when the switch 308 coupled to the controller 300 is toggled, flipped, electronically switched, or otherwise triggered.

The controller 300 may be communicatively coupled to the switch 308, the vacuum source 206, and one or more valves (e.g., valves 208, 212, 216, 220, and/or 224) of the waste system 200. For example, the controller 300 may be connected to one or more input/output (I/O) devices (e.g., switch 308), system components (e.g., vacuum source 206, valves 208, 212, 216, 220, and/or 224, etc.), and so forth via the communication interface 306. The controller 300 may be configured to operate the vacuum source 206 and the one or more valves in response to a signal from the switch 308.

In embodiments, the controller 300 may be configured to operate the waste system 200 as follows.

The controller 300 may be configured to receive a flush command (e.g., signal) that initiates the toilet flush sequence via the switch 308.

In response, the controller 300 may be configured to open the vacuum valve 208 and cause the vacuum source 206 to suction air out of the vacuum cell 202 through the vacuum valve 208 to generate a negative pressure in the vacuum cell 202.

In some embodiments, to depressurize the vacuum source 206 (e.g., between pump pulses) the controller 300 is configured to open a discharge valve 202 so that at least a portion of the air removed from the vacuum cell 202 can be discharged through a discharge vent 222.

The negative pressure in the vacuum cell 202 acts on the flexible cell 204 to generate a (second) negative pressure in the flexible cell 204.

The negative pressure in the flexible cell 204 acts on the waste container 210 to generate a (third) negative pressure in the waste container 210.

The negative pressure in the waste container 210 acts on an interface 214 between a toilet 218 and the waste container 210 to pull waste from the toilet 218 into the waste container 210. At this point, the negative pressure in the waste container 210 or the controller 300 may open flush valve 216 so that the waste from the toilet 218 can be pulled into the waste container 210. Excess air may also be ingested into the flexible cell 204 and/or waste container 210.

The flush valve 216 may close, marking an end of the toilet flush sequence.

The controller 300 may be configured to open the vent valve 220 so that air enters the vacuum cell 202 through the air intake vent 222 and removes the negative pressure from the vacuum cell 202. In other embodiments, the controller 300 may be configured to cause the vacuum source 206 (e.g., a pump or blower) to pump/blow air back into the vacuum cell 202 to remove the negative pressure from the vacuum cell 202.

The restorative air entering the vacuum cell 202 may push excess air out of the flexible cell 204. For this to happen, the controller 300 may be configured to open a discharge valve 224 between the flexible cell 204/waste container 210 and a discharge vent 226 so that excess air is discharged from the flexible cell 204/waste container 210 through the discharge vent 226.

The controller 300 may be configured to close the discharge valve 224 and vent valve 220/vacuum valve 208 after restoring air in the vacuum cell 202 and discharging excess air from the flexible cell 204 and/or waste container 210. The waste system 200 will then be restored to its initial (pre-flush) settings so that the toilet flush sequence can be repeated when the switch 308 is triggered again (e.g., by the next user).

It is to be understood that implementations of the methods disclosed herein may include one or more of the steps described herein. Further, such steps may be carried out in any desired order and two or more of the steps may be carried out simultaneously with one another. Two or more of the steps disclosed herein may be combined in a single step, and in some implementations, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A waste system, comprising:
   a waste container;
   a vacuum cell;
   a flexible cell with at least one flexible membrane at an interface between the flexible cell and the vacuum cell; and
   a vacuum source configured to suction air out of the vacuum cell to generate a negative pressure in the vacuum cell, wherein the negative pressure acts on the flexible cell to generate a second negative pressure in the flexible cell, the second negative pressure acts on the waste container to generate a third negative pressure in the waste container, and the third negative pressure acts on an interface between a toilet and the waste container to pull waste from the toilet into the waste container.

2. The waste system of claim 1, further comprising:
   a vacuum valve between the vacuum cell and the vacuum source, the vacuum valve configured to open when the vacuum source is suctioning air out of the vacuum cell and configured to close after the vacuum source has suctioned air out of the vacuum cell.

3. The waste system of claim 1, wherein the vacuum source is a pump.

4. The waste system of claim 3, wherein the pump is configured to pump air back into the vacuum cell to remove the negative pressure from the vacuum cell.

5. The waste system of claim 1, further comprising:
   a vent valve between the vacuum cell and an air intake vent, the vent valve configured to open so that air enters the vacuum cell through the air intake vent and removes the negative pressure from the vacuum cell.

6. The waste system of claim 1, further comprising:
   a discharge valve between the waste container and a discharge vent, the discharge valve configured to open so that excess air is discharged from the waste container through the discharge vent.

7. The waste system of claim 1, wherein the waste container, the vacuum cell, the flexible cell, and the vacuum source are integrated into a modular unit.

8. The waste system of claim 7, wherein the modular unit includes a common support structure for the waste container, the vacuum cell, the flexible cell, and the vacuum source.

9. The waste system of claim 1, further comprising:
   a switch; and
   a controller communicatively coupled to the switch, the vacuum source, and one or more valves, the controller configured to operate the vacuum source and the one or more valves in response to a signal from the switch.

* * * * *